United States Patent [19]

Otis, Jr. et al.

[11] 4,197,579
[45] Apr. 8, 1980

[54] MULTI-PROCESSOR FOR SIMULTANEOUSLY EXECUTING A PLURALITY OF PROGRAMS IN A TIME-INTERLACED MANNER

[75] Inventors: Alton B. Otis, Jr., San Francisco; Peter E. Forsman, Palo Alto, both of Calif.

[73] Assignee: Xebec Systems Incorporated, Santa Clara, Calif.

[21] Appl. No.: 913,084

[22] Filed: Jun. 6, 1978

[51] Int. Cl.² ............................................. G06F 9/20
[52] U.S. Cl. .................................................. 364/200
[58] Field of Search ........................ 364/200 MS File

[56] References Cited

U.S. PATENT DOCUMENTS

| | | | |
|---|---|---|---|
| 3,401,376 | 9/1968 | Barnes et al. | 364/200 |
| 3,573,852 | 6/1971 | Watson et al. | 364/200 |
| 3,676,852 | 7/1972 | Abernathy et al. | 364/200 |
| 3,689,895 | 9/1972 | Kitamura | 364/200 |
| 3,980,992 | 9/1976 | Levy et al. | 364/200 |

*Primary Examiner*—Harvey E. Springborn
*Attorney, Agent, or Firm*—C. Michael Zimmerman

[57] ABSTRACT

A computer processor is described capable of simultaneously executing a plurality of programs. It accomplishes this by utilizing the next instruction select elements of a processor to select the next instruction for one program, while the data processing elements of the processor are executing an instruction of another program. The processor includes in addition to the next instruction select and data processing elements normally found in a microprocessor, additional program dependent elements for each of the plurality of programs to be processed. That is, it includes for each of the programs to be processed, a program memory allocation, a program address register, and the non-shared data storage registers, such as accumulators.

8 Claims, 3 Drawing Figures

MULTI-PROCESSOR FOR SIMULTANEOUSLY EXECUTING A PLURALITY OF PROGRAMS IN A TIME-INTERLACED MANNER

BACKGROUND OF THE INVENTION

The present invention relates to computation processors and, more particularly, to a multi-processor capable of simultaneously executing a plurality of programs in a time-interlaced manner.

Because of their relatively low cost, microprocessors are now finding wide usage for information processing and control functions. It is often desirable, or required, that two or more processing functions be executed simultaneously in connection with a particular task to be performed. For example, sometimes more than one processing function is involved in the control of communication between a processor of a computing system and its various peripheral devices such as memory and/or input and output devices.

In the past whenever two programs are to be executed simultaneously in connection with a desired function, it has been the practice to include two separate and independent microprocessors for such purpose. The use of independent processors, though, can overly complicate the desired operation. For example, it is often desirable that the individual processors operate on the same data and/or provide results to the same destination. Relatively complicated control logic must be included in such an arrangement to prevent the two independent processors from simultaneously accessing the same data flow paths and data storage devices.

SUMMARY OF THE INVENTION

The present invention provides a multi-processor capable of simultaneously executing two separate programs (instruction sequences) in a time-interlaced manner. It does so in a manner which inherently eliminates the possibility of contention between the separate programs for access either to data sources or data destinations. And it is capable of providing multi-processing with only a small increase in the amount of logic required over that required for a single processor.

For a complete understanding of the invention, it must be remembered that high speed processors historically have been designed along two general architectural lines. In one architecture, a single phase processing cycle is used in which either data manipulation takes place or previous results are tested for possible program sequence branching (jumping). In cases with this architecture where no branching occurs, instructions are taken sequentially from memory thus allowing the next instruction to become ready (settle) while the current instruction is executing. When a branch occurs, however, the next instruction address changes (normally at some point beyond the start of the cycle) thus requiring the processor to hold or extend the cycle until the new instruction has settled.

The other architecture utilizes a two-phase processing cycle which sequentially combines a data manipulation phase and a result test-and-branch phase in each instruction. In general, due to the nature of the devices used for implementation, the time required to perform a data manipulation/test-and-branch sequence is essentially the same in either architecture, even though only a single instruction is accessed in the latter approach.

For either architecture the physical implementation separates the data manipulation (data processing) logic from the test-and-branch (next instruction select) logic although the data being tested is normally that output from data manipulation (in the same or previous instruction cycle). Thus for each data manipulate/test-and-branch sequence part of the logic remains idle during each phase of the sequence (e.g., during data manipulation the test-and-branch logic is idle and vice versa).

The multi-processor of the invention takes advantage of the above by utilizing the elements of a processor which are independent of data processing to condition the processor to execute an instruction of one program at the very same time that the data processing elements thereof are executing an instruction from another program. As a result, better utilization of all elements is obtained by so time interlacing the execution of more than one independent instruction sequence. This technique allows implementation of a multi-processor that uses only a single set of the basic processing elements and allows for inter-processor communication without contention. The only additional elements required by the microprocessor architecture for such simultaneous execution of separate programs are those which are program-dependent, e.g., program address registers, accumulators, etc. Suitable interlacing logic is also required.

While the concept of the invention is applicable to the concurrent execution of any number of separate programs greater than one, it finds its most efficient implementation in a dual processor arrangement, i.e., one in which two programming entities are concurrently executed. In this connection, it is important to note that there are two phases of each processing cycle of a standard microprocessor architecture, a data processing phase followed by a next instruction select phase. This two-phase operation lends itself quite readily to the concurrent execution of two separate programs during each cycle.

The invention includes other features and advantages which will be discussed or will become apparent from the following more detailed description.

BRIEF DESCRIPTION OF THE DRAWING

With reference to the accompanying two sheets of drawing.

DETAILED DESCRIPTION OF THE PREFERRED EMBODIMENT

Figure 1:
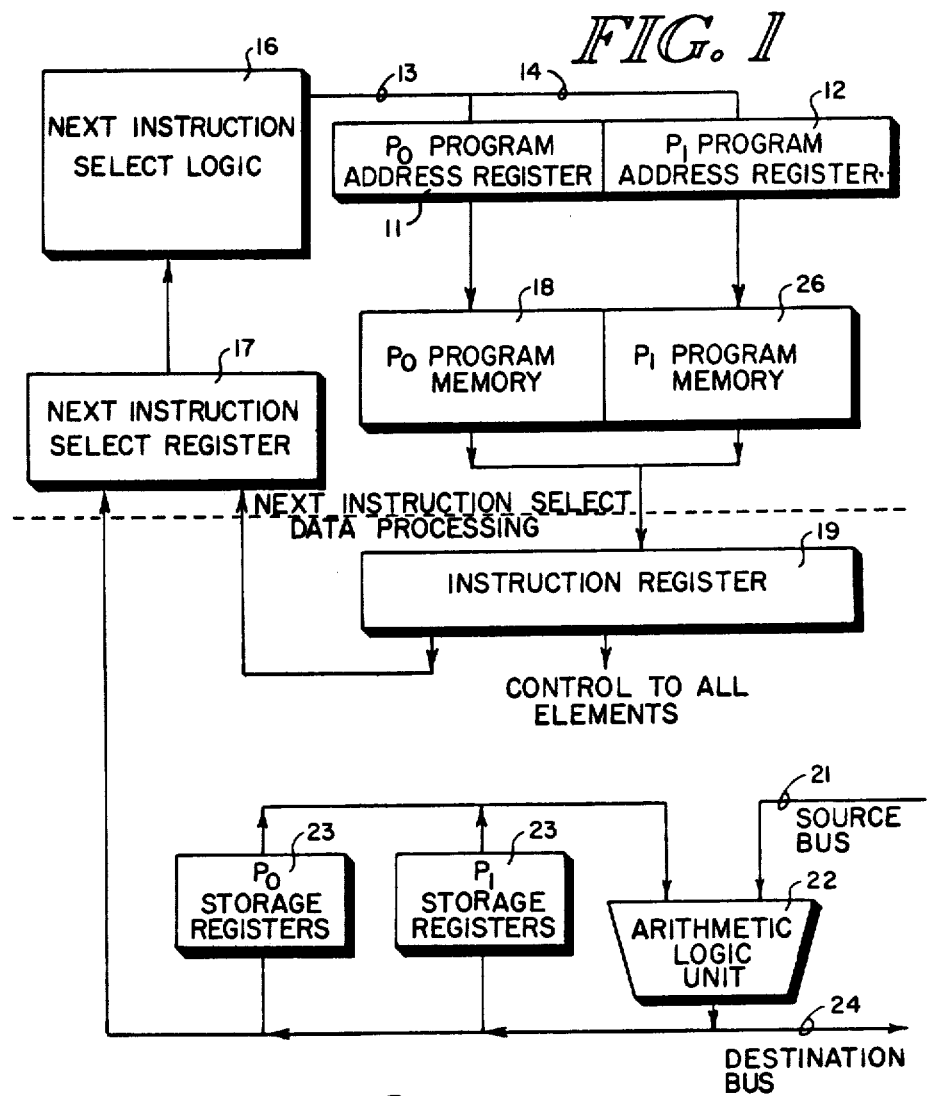
FIG. 1 is a block diagram of a simple dual processor arrangement constructed in accordance with the invention.
Figure 3:
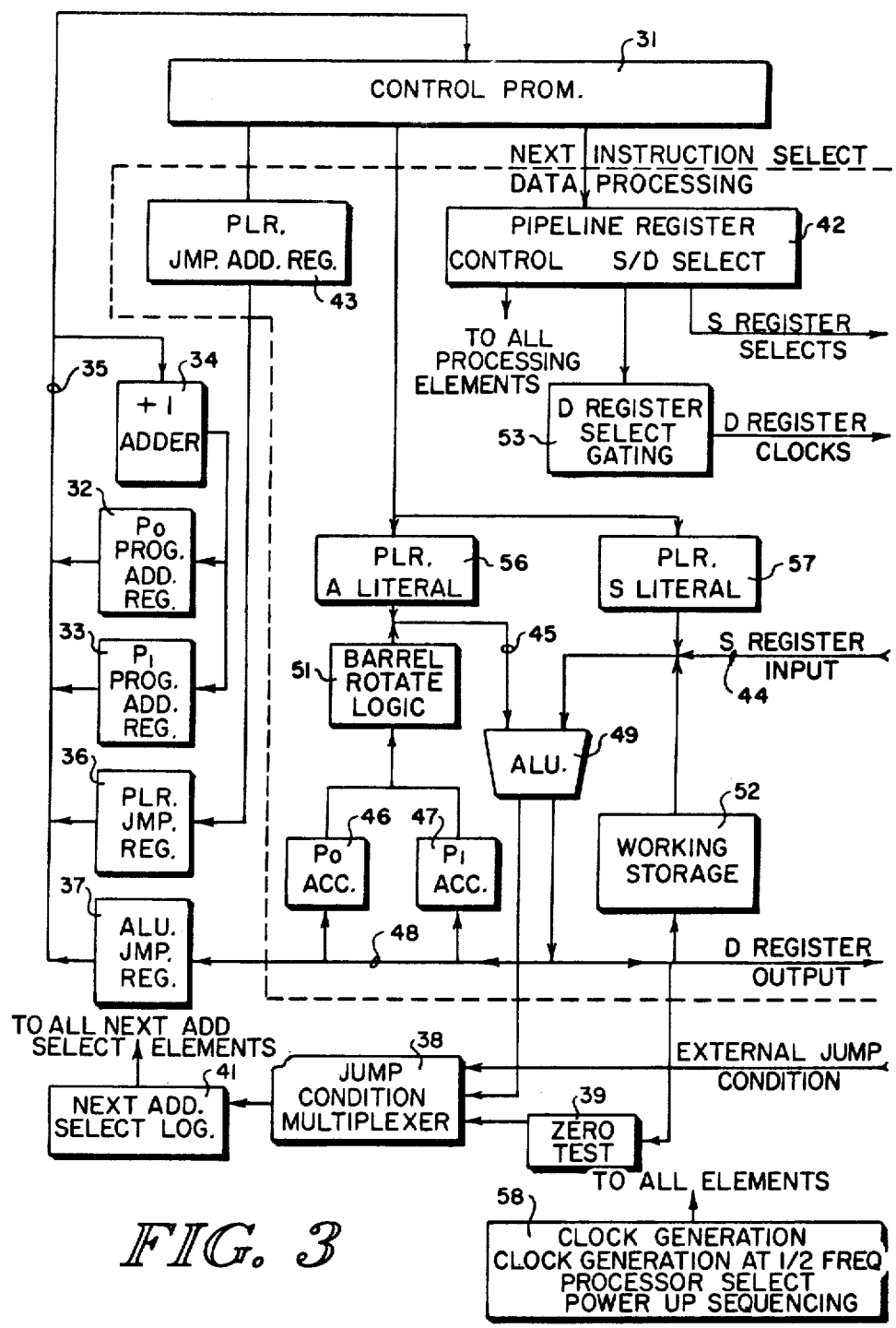
FIG. 3 is a block diagram of a preferred embodiment of the invention having general applicability.

FIG. 1 illustrates a simplified architecture of a dual processor of the invention. It is included to facilitate an understanding of the invention. It is recognized, however, that any actual implementation of the invention will be more complex. FIG. 3 illustrates the best mode contemplated by the inventors of carrying out the invention for general use.

The processor illustrated in FIG. 1 is divided into two sections, a "next instruction select" section and a "data processing" section. The "next instruction select" section of the processor is utilized by one program (one instruction sequence) simultaneously with utilization of the "data processing" section by another program (another instruction sequence). Such utilization of the two sections of the processor by the two separate programs is alternated sequentially in time to provide simultaneous execution of the two programs in a time-interlaced manner. This is represented in the timing diagram of FIG. 2. A complete processing cycle of the multiprocessor is divided into two phases (half-cycles), a data processing phase and an instruction select phase. While the processor is executing a data processing phase for one of the programs represented by, for example, $P_0$, it is simultaneously defining for the other program, program $P_1$, the next instruction to be processed in such other program. And while the processor is executing such instruction of program $P_1$, the next instruction to be executed in program $P_0$ is being defined. The processing cycles are repeated in this manner until the two programs are completed.

The "next instruction select" section of the processor includes a pair of program address registers 11 and 12, one for each of the two programs to be processed. Each is loaded under the control, as represented by flow lines 13 and 14 of next instruction select logic 16. The next instruction to be executed in a particular program is defined by the contents of a next instruction select register 17, which register is loaded at the completion of the execution of an instruction as will be described hereinafter. The next instruction select logic 16 responds to the contents within register 17 by defining the addresses to be loaded into the address registers 11 and 12.

Address registers 11 and 12 are loaded alternately, i.e., each is loaded when the particular program with which it is associated has control of the "next instruction select" section of the processor. The contents of a program address register at any given time defines the particular address, in the program memory with which it is associated, of the next instruction to be executed. Such instruction is fed from associated program memory to the instruction register when the processor is ready to execute the instruction. For example, assuming that it is program $P_0$ which during a particular half-cycle has control of the next instruction select logic, the program address fed into the program address register 11 during such half cycle shall be accessed from the $P_0$ program memory 18 and fed to the instruction register 19 at the end of such half-cycle.

Figure 2:
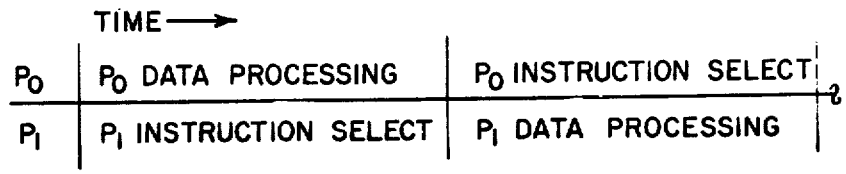
FIG. 2 is a timing diagram showing the interlaced manner of execution of two separate programs.

As can be seen from the timing diagram of FIG. 2, the end of an instruction select half-cycle or phase for a particular program is the beginning of a data processing half-cycle or phase for the same program. Thus, simultaneously with the feeding into the instruction register 19 of the next instruction to be executed for a particular program, the program is given control of the "data processing" section of the processor. The instruction fed into register 19 includes sufficient information to define the particular processing step it represents, and the data processing section reacts to the contents of register 19 to execute the instruction in a conventional way. That is, the instruction fed into register 19 will define the sources of data to be manipulated and the manipulation to be performed, and conventional control logic will direct the same to the arithmetic logic unit (ALU) for such manipulation. The source of the data normally is a register external to the dual processor architecture shown and applied to the source bus 21 for input to arithmetic logic unit 22, and a storage register 23 (e.g., an accumulator) associated with the program having control of the data processing section of the processor.

The instruction in register 19 will also define the destination of the results of the ALU manipulation and direct the processor control logic to gate such results accordingly. As represented by the ALU output flow path lines, such results may be directed singly or simultaneously to an external destination via destination bus 24, to a storage register 23, and to next instruction select register 17. The results gated into next instruction select register 17 will be utilized in the event the next instruction to be processed in the particular program is dependent upon the result of the previous instruction.

While the instruction from program $P_0$, for example, is being executed by the data processing section of the processor, the next instruction to be executed in the other program, program $P_1$, is being defined. In this connection, when the $P_0$ instruction is gated into instruction register 19 for execution, the portion of the previous $P_1$ instruction therein relating to the next $P_1$ instruction to be executed is fed to the next instruction select register 17. This is at the same time the data processing section completes its execution of the previous $P_1$ instruction. Thus the contents, if any, of the instruction register relating to the next $P_1$ instruction will be fed to the next instruction select register 17 at the very same time as the arithmetic logic unit 22 also provides its results to the next instruction select register for such program $P_1$. Thus, while the data processing section of the architecture executes the instruction fed into instruction register 19 from $P_1$ program memory 26, the next instruction select register 17 will have data therein defining the next instruction of the instruction sequence of program $P_0$. Such instruction data will be decoded by next instruction select logic 16, and the address of such instruction will be fed into the program address register 11 devoted to program $P_0$. Utilization of the two sections of the processor in this manner is alternated between the two programs until the instruction sequence of each is completed.

It will be recognized from the above that processor action is triggered by the edge of clock pulses. While it has been found that for simplicity and high speed operation such edge triggering is most desirable, it will also be recognized by those skilled in the art that the invention could be modified relatively simply to rely on other timing arrangements for operation. And while the above description describes implementation of the invention for two programs, it will be apparent to those skilled in the art that the concept is equally applicable to multiple programs. Additional programs can be executed by the addition to the system of those additional program dependent elements, e.g., program address registers, program memory sections, storage registers, which may be required to accommodate such additional programs. Each half-cycle of a complete processing cycle will then itself be divided between the additional programs.

The manner in which this invention eliminates the possibility of contention between programs for data paths, data sources and destinations, should be readily apparent. That is, since only one program is utilizing the data processing section of the processor at any given time, it is only such program which will have access to the data paths and registers of such section. Thus, the utilization of such common paths and data sources or destinations by the two different programs will be completely synchronized.

It should also be readily apparent from the above that the instant invention enables two programs to be executed in the same time one of such programs would be executed by a conventional microprocessor having the same characteristics. That is, those elements of the microprocessor which would be idle for one-half of each processing cycle if only one program was being executed are utilized during such time by the other program. With proper programming this time-interlaced utilization of the microprocessor elements does not prolong the time required to execute either of the two programs. And while there may be some time prolongation in the event more than two programs are executed by the invention in such an interlaced manner, other advantages of the arrangement, e.g., elimination of bus contention and/or reduction in circuitry, may warrant its use in an implementation requiring the simultaneous execution of more than two programs.

Reference is now made to FIG. 3 for a showing of a preferred embodiment of the invention. The "next instruction select" and the "data processing" sections of the illustrated processor, are distinguished from one another by a dotted line similar to that used in FIG. 1.

A control PROM 31 (programmable, read-only memory) is included to provide memory for the separate storage of each of the programs to be executed by the processor in a time-interlaced manner. PROM 31 is selected to have a size large enough to accommodate the instruction sequences of all of the programs to be run simultaneously by the multi-processor. In this connection, the invention is most efficiently utilized when there are only two of such separate programs as mentioned above. This preferred embodiment is designed for two programs. As will be seen, the circuitry required for the execution of two programs is not much more than that required for a conventional processor designed to execute a single program. It is only the processor dependent elements which must be duplicated. And since a processing cycle is generally divided into two sequentially operated half-cycles, the two half-cycles can be most efficiently used alternately by two programs.

This preferred embodiment includes program address registers 32 and 33 for each of the separate programs to be processed. In this connection, it should be noted that it is contemplated the implementation circuitry include three-state logic to permit the selective application to one bus or line of the contents of one of a plurality of registers, without a multiplexer being necessary.

Increment logic, represented by +1 Adder block 34, is included to increment by one, the value applied to control PROM address bus 35 and feed it back to program address register 32 or 33. Thus in this implementation the program address registers will always contain the address of the next sequential instruction. Means are included enabling the selection, if desired, of a jump address for either of the programs. To this end a jump register 36 is included to apply to the control PROM 31 a jump address for either of the programs provided by the previous instruction of the program. It also includes an ALU jump register 37 to apply to the control PROM 31 a jump address defined by the results of the previous instruction manipulation of the program of concern.

The preferred embodiment enables actuation of an address jump to be effected several ways. To this end, a jump condition multiplexer 38 is provided having as its OR inputs, the "carry" bit output of the ALU, an external jump signal line, and a zero test signal line connected to the output of the ALU. The zero test logic is indicated in the block diagram by block 39. The output of multiplexer 38 is fed to next address select logic control, indicated by block 41, which directs gating of the appropriate jump address to control PROM 31.

The instruction register function in this preferred embodiment is provided by a pipeline register 42 and a jump address holding register 43. When the control of the data processing section is turned over to the program which in the previous half-cycle had control of the next instruction select section, the instruction selected from control PROM 31 is fed into registers 42 and 43. That is, that portion of the instruction which defines the sources and destinations of the data to be manipulated, as well as the processing manipulations to be carried out, is fed into register 42. The portion of the instruction which indicates the sources of data to be processed selects the same and controls logic to cause such data to be applied to the source register input bus 44 and the accumulator input bus 45. In this connection, a pair of accumulator registers 46 and 47, one for each of the programs to be processed, is connected between the destination bus 48 and the arithmetic logic unit (ALU) 49.

The outputs of the accumulators 46 and 47 are connected to the bus 45 via barrel rotate logic 51. Logic 51 is for the purpose of shifting, if desired, the data provided by either of the accumulators 46 and 47, prior to it being fed to the ALU.

The data applied to the source bus 44 may be supplied by working storage, indicated by block 52. Separate portions of such working storage could be allocated to the individual programs being processed. A third portion of the same could be allocated to both programs, providing communication therebetween. In this connection, it may include either buffer storage or, in the event of an asynchronous operation of the two programs, FIFO storage.

It should be noted that although in this preferred embodiment separate source and destination busses 44 and 48 are utilized, the invention is also applicable to an arrangement in which a common bus is used for both source and destination data.

The instruction fed into pipeline register 42 will also define the destination of the results of the data manipulation. Such results will be clocked at the end of the data processing half-cycle into the destination registers or memory. The logic for performing this function is represented in the figure by block 53. The destination could be the accumulator 46 or 47 assigned to the particular program having control of the data processing section at the time; the working storage 52; an external register, memory or output device; or combination thereof.

The contents of pipeline register 42 will also define the various manipulations required for executing the instruction. This is represented in the drawing by the line labelled "Control" emanating from the pipeline register 42 to all processing elements. Any portion of an instruction defining a jump address is fed into holding register 43. In the event the instruction also includes data to be used in execution of such instruction, the data is fed at such time from the control PROM to either a literal register 56 having its output connected to the ALU, or a literal register 57 having its output connected to the source bus.

The preferred embodiment of the multi-processor also includes, of course, a clock for generating timing of the operation of the components. In this connection, it is preferred that such timing be edge triggered as discussed previously. Logic will also be provided to divide the clock frequency in one-half to define the half-cycles utilized by the two programs. It will also include, of course, processor select and power up sequencing logic. All of such logic is represented in FIG. 3 by block 58.

The operation of the above embodiment will be apparent to one skilled in the art when it is considered along with the description associated with FIG. 1. The addition to the basic concept, of means enabling the selection of a jump address, barrel rotate logic, literal registers, etc., provides the multi-processor of the invention, in a simple manner, with the capability of processing relatively complex programs.

While the invention has been described in connection with a preferred embodiment, it will be appreciated that various changes and modifications can be made within the spirit of the invention. It is therefore intended that the coverage afforded applicant be defined only by the claims and their equivalent language.

We claim:

1. A digital processor capable of simultaneously processing individual instructions from a plurality of separate instruction sequences in a time-interlaced manner comprising:
   A. means to furnish data to be processed;
   B. means to store separately each of said separate instruction sequences;
   C. a single arithmetic logic unit to perform arithmetic logic manipulations of data for said separate instruction sequences;
   D. means to provide the address to said data furnishing means of the data to be manipulated by said arithmetic logic unit in response to individual instructions automatically selected alternately from said plurality of instruction sequences;
   E. means to cause said arithmetic logic unit to execute selectively the instructions of said separate instruction sequences in a time-interlaced manner;
   F. means to deliver individual instructions to said arithmetic logic unit automatically selected alternately from said plurality of separate instruction sequences;
   G. means to automatically select simultaneously with the execution by said single arithmetic logic unit of an instruction selected from one of said instruction sequences the next individual instruction of another one of said instruction sequences to be executed by said single arithmetic unit; and
   H. means to store separately the results of manipulations made by said single arithmetic logic unit in response to individual instructions from each of said separate instruction sequences for later recall for further manipulation by said arithmetic logic unit in response to a subsequent instruction from one of said instruction sequences.

2. A digital processor according to claim 1 further including means for delivering data contained within an instruction to said arithmetic logic unit.

3. A digital processor according to claim 1 wherein there are at least two of said separate instruction sequences to be processed, and said means to provide the address of data to be manipulated by said processor means includes a separate program address register for each of said two separate instruction sequences.

4. A digital processor according to claim 1 wherein said means to provide the address of data to be manipulated by said arithmetic logic unit includes a separate program address register for each of said separate instruction sequences, and means are included enabling the selection from any of such instruction sequences of a jump address.

5. A digital processor according to claim 4 wherein said means to store separately the results of manipulations made by said arithmetic logical unit includes an accumulator register for each of said instruction sequences, and barrel rotate logic is provided for shifting the contents of each of said accumulators.

6. A digital processor according to claim 4 wherein said means to furnish data to be processed includes a source bus for conveying data to said arithmetic logic unit, and a separate destination bus is included for conveying data away from such arithmetic logic unit.

7. A digital processor according to claim 6 further including working storage connected between said source and destination buses to enable data communication therebetween.

8. A digital processor according to claim 4 wherein said means enabling the selection from any of such instruction sequences of a jump address including means for enabling the selection of either a computed or an immediate jump address.

* * * * *